Jan. 17, 1933.  H. M. MATHERS  1,894,470
DATE INDICATING CALENDAR
Filed Aug. 11, 1931   5 Sheets-Sheet 1
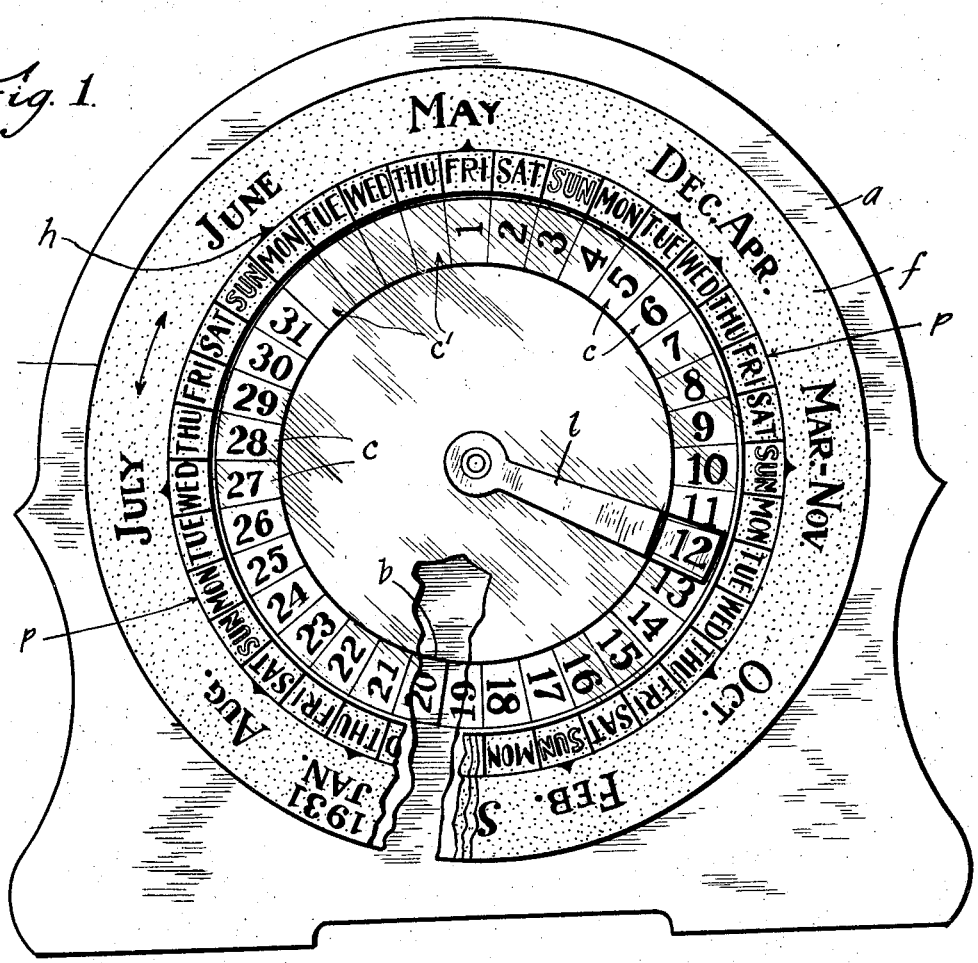
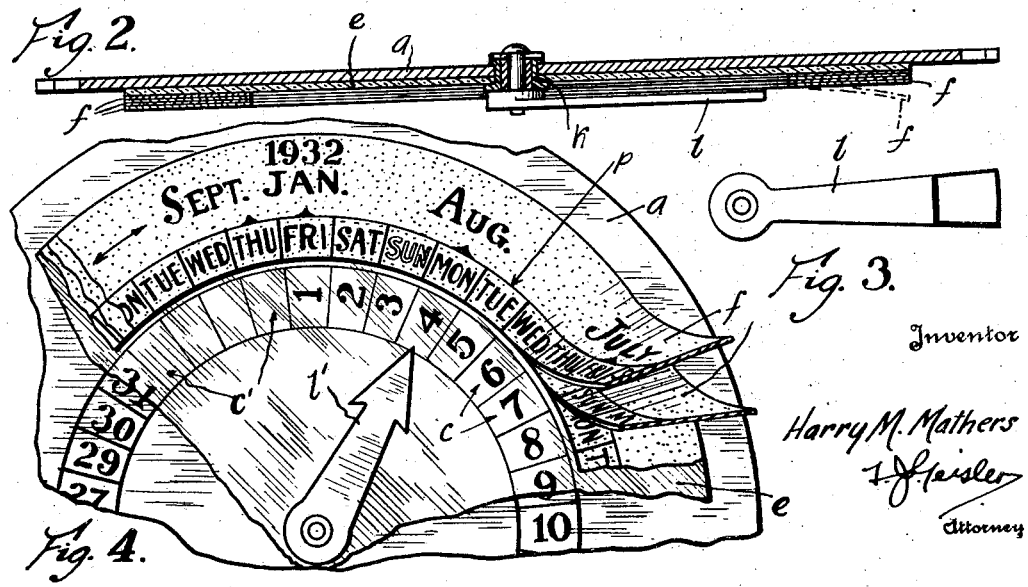
Inventor
Harry M. Mathers
Attorney Jan. 17, 1933.    H. M. MATHERS    1,894,470
DATE INDICATING CALENDAR
Filed Aug. 11, 1931    5 Sheets-Sheet 2

Inventor:
Harry M. Mathers
by J. J. _____ Attorney

Jan. 17, 1933.   H. M. MATHERS   1,894,470
DATE INDICATING CALENDAR
Filed Aug. 11, 1931   5 Sheets-Sheet 3

Inventor
Harry M. Mathers
T. J. Geisler
By
Attorney

Jan. 17, 1933.  H. M. MATHERS  1,894,470
DATE INDICATING CALENDAR
Filed Aug. 11, 1931   5 Sheets-Sheet 4
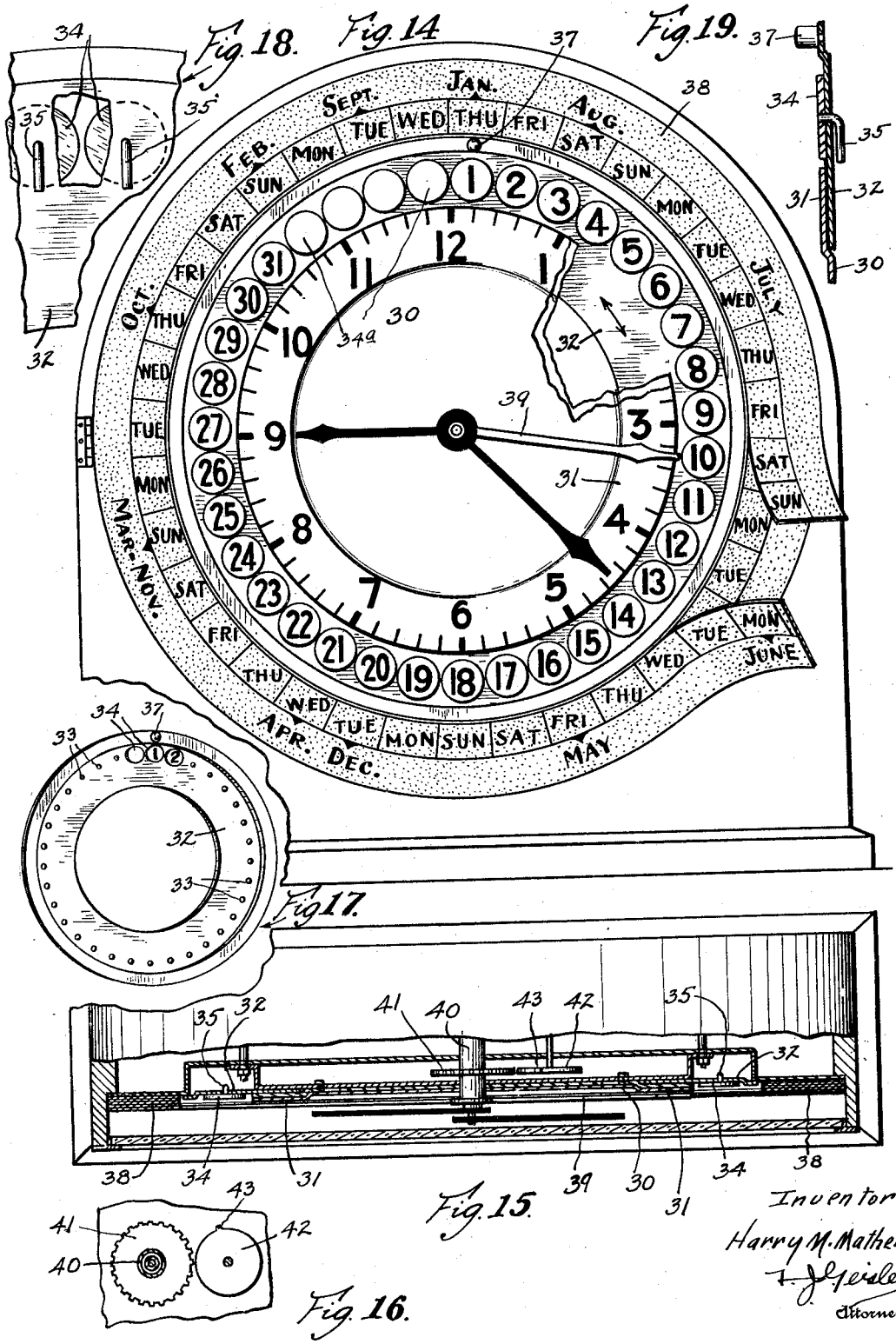
Inventor:
Harry M. Mathers
Attorney Jan. 17, 1933.   H. M. MATHERS   1,894,470
DATE INDICATING CALENDAR
Filed Aug. 11, 1931   5 Sheets-Sheet 5

Inventor
Harry M. Mathers
F. J. Geisler
Attorney

Patented Jan. 17, 1933

1,894,470

UNITED STATES PATENT OFFICE

HARRY M. MATHERS, OF PORTLAND, OREGON, ASSIGNOR OF THIRTY-NINE ONE-HUNDREDTHS TO HOWARD M. COVEY, NINETEEN ONE-HUNDREDTHS TO FRANK L. MATTER AND THREE ONE-HUNDREDTHS TO ANNA RUEGER, ALL OF PORTLAND, OREGON

DATE INDICATING CALENDAR

Application filed August 11, 1931. Serial No. 556,356.

My invention relates to annular date calendars.

The object of my invention is to provide a simple and readily understood annual calendar adapted by a simple manual manipulation or by a suitable clock mechanism to indicate the succeeding days of the week and month as they occur and also to indicate by a manual manipulation, the day of the week upon which any day of the month falls throughout the year, or the number of days in any month.

I am aware that calendars adapted for a similar purpose have heretofore been used, but such calendars are quite complicated and costly to manufacture and can only be understood after considerable study, and are thus not adapted for general use.

A further object of my invention is to provide a practically perpetual calendar which is so simple of construction and economical of manufacture as to be sold at a relatively low cost or used as an advertising medium, as may be desirable.

A still further object of my invention is to provide an annular calendar adapted to be combined with a clock and operated by the clock mechanism with but a slight modification of the latter, whereby to provide full information as to the time of the day, week and month by means of a single instrument.

A still further object of my invention is to provide a practically perpetual calendar by superimposing one upon the other a series of annual sheets arranged according to the succeeding years, so that as a year passes, the old calendar sheet may be torn off to expose the calendar sheet of the new year, and further to provide means adapted to restrain the names of the days of the month in an upright position notwithstanding the rotary manipulation of the calendar to indicate the succeeding months as they occur.

I attain my above objects in a date indicating calendar comprising a primary circular disc provided on the margin of its face with consecutive groups of the names of the days of the week arranged seriatim and a secondary circular disc provided on its face with the numerals 1 to 31, inclusive, the said numerals arranged to coincide with the consecutive names of the week days on the primary disc, the spaces between the numerals 31 and 1 being left blank, one of said discs being relatively rotatable, whereby the relative rotation of one of said annular discs to bring the first of said numerals into registration with the week day name on which the first day of a particular month falls will adjust the calendar for such month and a clock driven hand pivoted on the axle of rotation of the rotatable disc.

These and other incidental objects of my invention, the details of construction and mode of operation thereof are hereinafter fully described with reference to the accompanying drawings.

In the drawings:

Fig. 1 shows a front view of my calendar with portions broken away to illustrate the relative arrangement of the parts;

Fig. 2 shows a central transverse section of Fig. 1 and further illustrates the relative arrangement of the parts;

Fig. 3 shows the rotatable hand or pointer removed from the calendar;

Fig. 4 shows a fragmentary front view of my calendar as shown in Fig. 1 and illustrates the relative arrangement of the year sheets;

Fig. 14 shows a still further modification of my calendar adapted to be combined with a clock;

Fig. 15 shows a central transverse section of the same;

Fig. 16 shows a fragmentary detail of the clock mechanism and illustrates the means for operating the calendar hand;

Fig. 17 shows a detailed view of the rotatable disc carrying the date ring removed from the calendar;

Fig. 18 shows a detailed view of the rear of the date ring and illustrates how the smaller discs are secured thereto;

Fig. 19 shows a section taken on the line 19—19 of Fig. 18;

Figure 5:
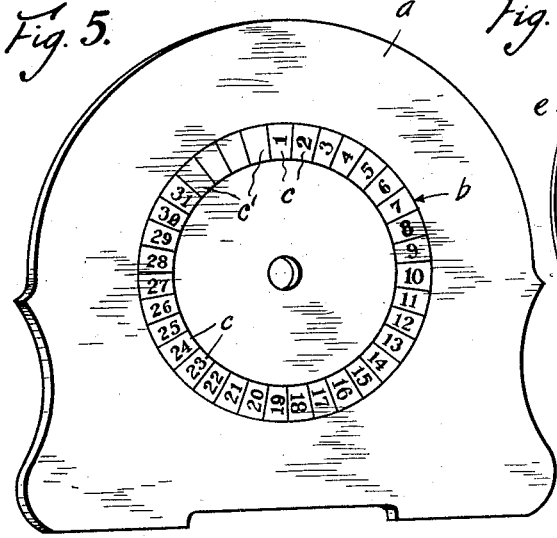
Fig. 5 shows the back section upon which the numerals of the days of the month are printed and which I have designated the date ring.
Figure 6:
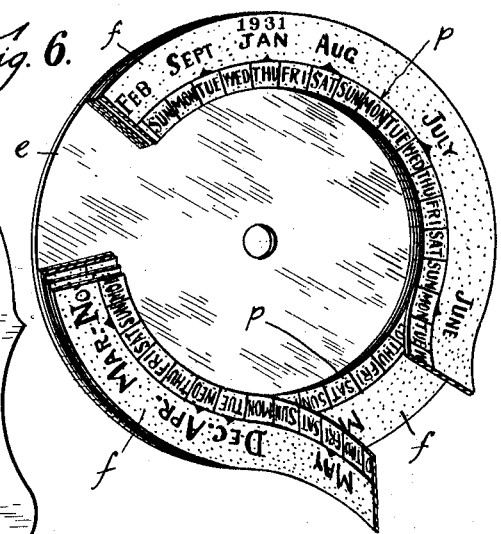
Fig. 6 shows a perspective view of the rotatable disc removed from the back section and the year sheets carried thereby.

Referring now to Figures 1 to 6: I have illustrated a simple form of my calendar which comprises a back section $a$ upon which is printed an annular ring which I will term the date ring $b$, divided into 35 equal sections $c$, see Fig. 5. The sections $c$ are numbered from 1 to 31 consecutively, the remaining four spaces $c'$ being left blank.

A transparent disc $e$ is rotatably mounted upon a centrally located pivot preferably a tubular rivet $k$, secured on the back section $a$. The disc $e$ is provided on its circumferential margin with a series of super-imposed annular sheets $f$, preferably of thin paper and of such diameter as to circumscribe the said date ring $b$. The back section $a$ may be of cardboard or similar material and the disc $e$ of celluloid or like transparent substance.

Upon the inner margin of the sheet $f$ is printed an annular ring $p$ divided into 35 spaces arranged to register with the spaces of the date ring $b$, in which are printed in successive order the names of the days of five weeks. On the outer margin of the sheet $f$ is printed the names of the months, so arranged according to the year that each month is opposite the day of the week upon which its first day falls, see Figs. 1 and 4, which show the years 1931 and 1932.

The uppermost sheet $f$ is arranged for the year 1931 and the underlying sheets are successively arranged for the years 1932, 1933, etc. and are secured one on the other by a suitable shellac coating or the like, which also protects the face of the exposed sheet.

Markers $h$ are preferably provided for the week days opposite each month to prevent mistakes in determining the week day upon which the first day of the month falls. A pointer or hand $l$ is rotatably mounted upon the said tubular rivet $k$ which may be transparent as shown in Fig. 1 and extends over the figures on the date ring $b$, or an arrow $l'$ as shown in Fig. 4.

By this construction the date ring $b$ is visible through the transparent disc $e$ and advertising matter or other information may be printed on the back section in the center of the date ring as may be desirable.

In the use of my calendar, say it is to be set for the month of May, 1931, as illustrated in Fig. 1, the disc $e$ is rotated until the Friday opposite May which is the week day upon which the first day of the month falls and is indicated by the marker $h$, is opposite the numeral 1 on the date ring $b$. The ensuing days of the week will then properly follow. To indicate the present day, for example the 12th, the hand $l$ will be moved to the numeral 12, which being opposite Tuesday shows it is Tuesday the twelfth of May.

Similarly if the month is July, the disc $e$ will be rotated until the Wednesday opposite July is opposite the numeral 1 on the date ring $b$. Further the number of days in any given month may be determined by merely observing, when the disc $e$ is set for a particular month, the last numeral, just before the week day indicating the first day of another month.

Also if it is desirable to know what week day a certain day of the month falls or vice versa, as for example the sixth of May or the day of the month upon which the first Wednesday falls, the disc $e$ is rotated until the first week day of the month is opposite the numeral 1, then counting from 1, May sixth falls on a Wednesday, and inversely the first Wednesday falls on the sixth of May.

When using my calendar from day to day, the pointer $l$ is moved ahead each day. When the end of the month arrives, the disc $e$ is rotated to bring the next succeeding month opposite the numeral 1 on the date ring $b$ and the pointer $l$ is moved over the blank sections $c'$ to the Fig. 1. In the case of 30 day months and February, the pointer is, of course, moved ahead over all the intervening spaces to the numeral 1 on the date ring $b$.

Figs. 7 to 10 illustrate a further form of my invention in which the back section 10 is provided with a series of superimposed year sheets 11, similar in all respects to the year sheets f before described, except that they are stationary. A transparent disc 12 is centrally and rotatably mounted upon the back section 10 of such diameter as to lie within the sheets 11 and upon which is provided a date ring 14 having 35 spaces arranged to register with the week day names on the year sheet and numbered from 1 to 31, inclusive, the remaining four spaces being left blank, as before described with reference to Figs. 1 to 6.

Further, in this form of my invention I have provided a simple clock mechanism 2 upon the shaft 3 of which I have mounted a pointer or hand 4, the clock mechanism being adapted to move the pointer 4 one space each day, so that my calendar will be automatic in operation except that at the end of the month the disc 12 must be rotated into position for the new month.

Figure 7:
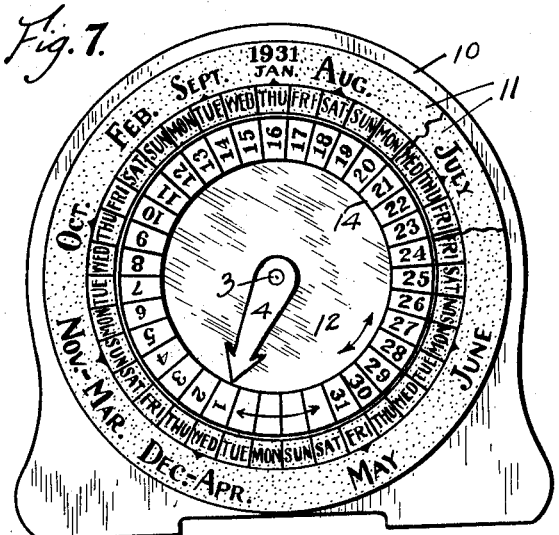
Fig. 7 shows a modification of my calendar in which the year sheets are carried by the back section and the date ring is mounted upon a rotatable disc.
Figure 8:
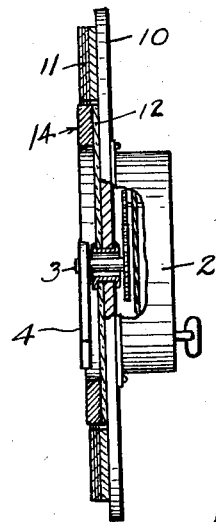
Fig. 8 shows a central transverse section of the modification shown in Fig. 7 and illustrates the relative arrangement of the parts.
Figure 9:
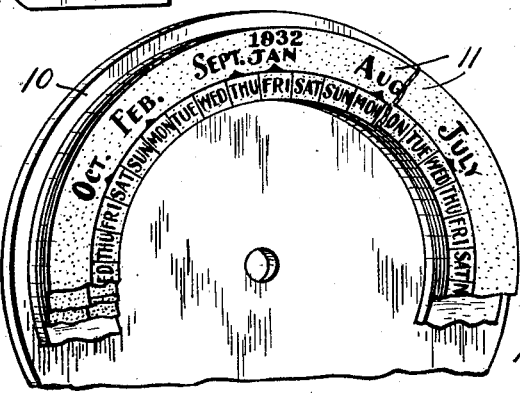
Fig. 9 shows a fragmentary view of the back section and illustrates the relative arrangement of the year sheet succeeding that shown in Fig. 7.
Figure 10:
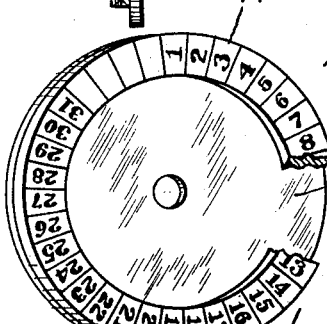
Fig. 10 shows a perspective view of the rotatable disc carrying the date ring removed from the calendar.

The advantage of making the date ring 14 rotatable is that at the end of the month the hand or pointer 4 need not be moved over the intervening blank spaces, as before described, since the hand at the end of the month, having moved up to the next week day, will be in position to be opposite the numeral 1, on the date ring when it is rotated to be opposite the day of the week upon which the first day of the month falls, as illustrated in Fig. 7, in which the date ring has just been brought into position for the month of December and the hand 4 has been rotated from the 30th day of November.

Figure 11:
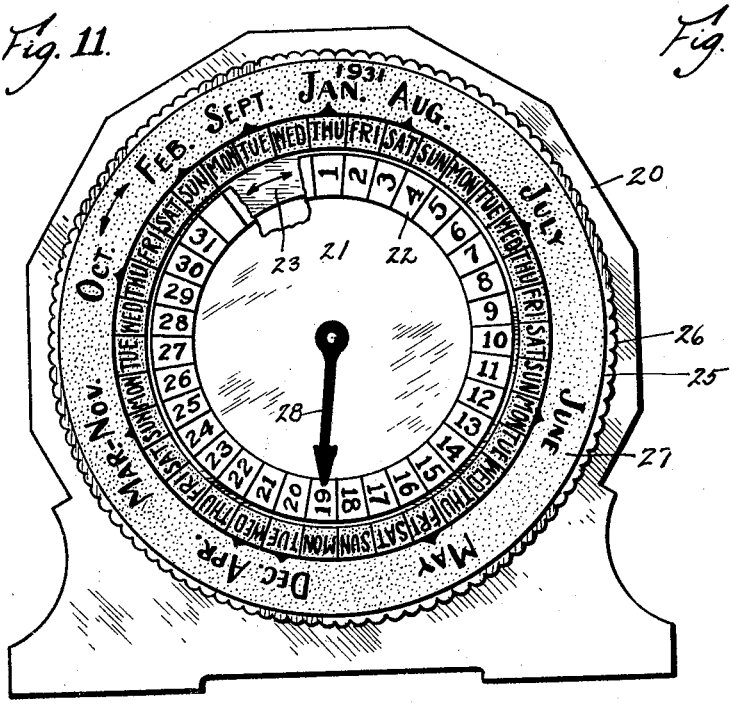
Fig. 11 shows a view of a further modification of my calendar which is somewhat more simple in construction.
Figure 12:
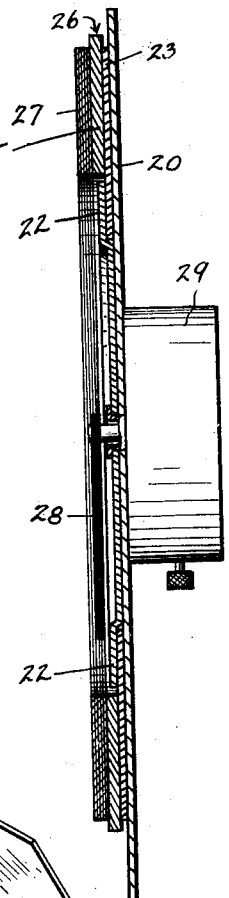
Fig. 12 shows an enlarged central transverse section of the same.
Figure 13:
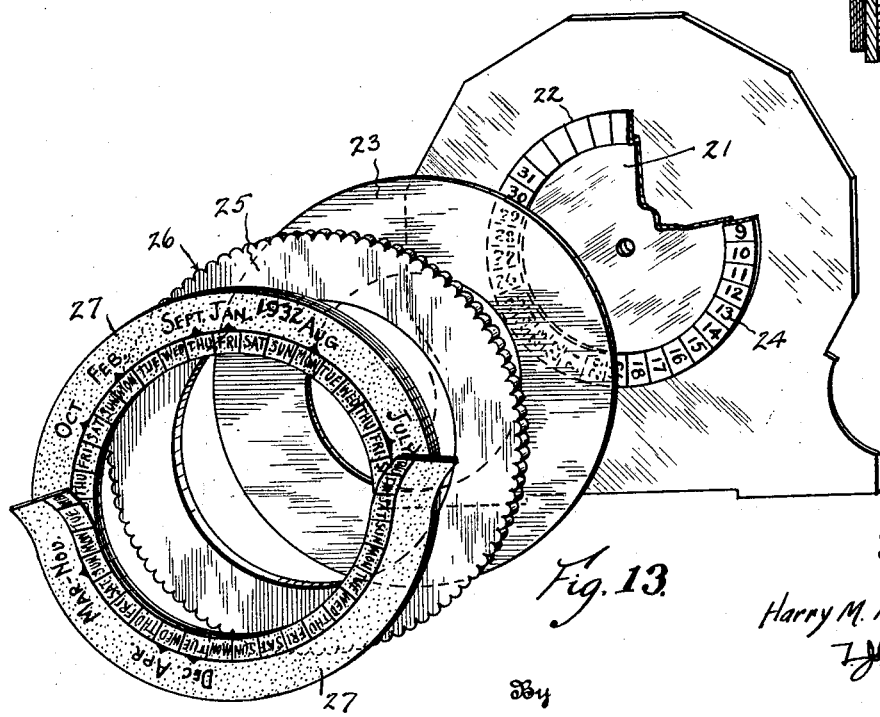
Fig. 13 shows a perspective view of such modification with the parts detached but arranged in order of assembly.

Figs. 11 and 12 show a further modification of my calendar comprising a back section 20 provided with a stationary disc 21 the peripheral margin 22 of which is raised to form an annular marginal recess on which is rotatably mounted an annular disc 23. On such raised portion 22 is printed a date ring 24, similar to that before described. On the disc 23 is provided a supplementary disc 25 having a crenelated edge 26 and upon which are secured a series of superimposed year sheets 27 similar to those before described. A pointer or hand 28 is also provided operated by a clock mechanism 29.

The crenelated edge 26 of the disc 23 which extends somewhat beyond the margin of the year sheets, provides convenient means for rotating the latter.

It is to be noted, as mentioned, that such arrangement of my calendar provides a central space within the date ring, upon which advertising matter or other information may be printed.

Further, such arrangement permits my calendar to be incorporated with the usual time clock, with but slight modification of the latter, so that full information not only as to the time of day, but also the time of the week and month is provided.

To this end, in Figs. 14 to 19, I show how my calendar is combined with a clock by providing the clock face 30 with a circumferential raised portion 31 upon which are printed the hours and under which an annular disc 32 is mounted which extends beyond the margin of the clock face and is provided with 35 evenly spaced holes 33. In such holes are rotatably secured 35 smaller discs 34, having the numerals 1 to 31 inclusive, printed thereon, the remaining four discs 34a being left blank and which constitute the date ring. The discs 34 are provided on their rear surfaces with central radially extending arms 35 which are inserted through the holes 33 and serve by their weight to maintain the numerals printed thereon in upright position, as the disc 34 is rotated.

Concentric with the date ring is provided a series of superimposed year sheets 38 which are stationary and similar to those before described.

By these means the date ring is conveniently rotatable by means of a projecting stud 37 in order to bring the numeral 1 into registration with the week day upon which the first day of the next month falls.

A pointer or hand 39 is provided carried upon the shaft 40 of the clock and provided with a sprocket 41, which meshes with a mutilated sprocket 42 having a single tooth 43 driven by the clock mechanism. Thus each revolution of the sprocket 42 moves the hand 39 one section each day on the date ring.

It is further to be noted that in this modification a single year sheet may be provided with the names of the months left off so that a practically perpetual calendar is provided only requiring that the date ring be moved at the end of each month to bring the latter into registration with the first day of the succeeding month, the only information needed being the week day upon which the first day of the month falls at the time the clock is set.

Figure 20:
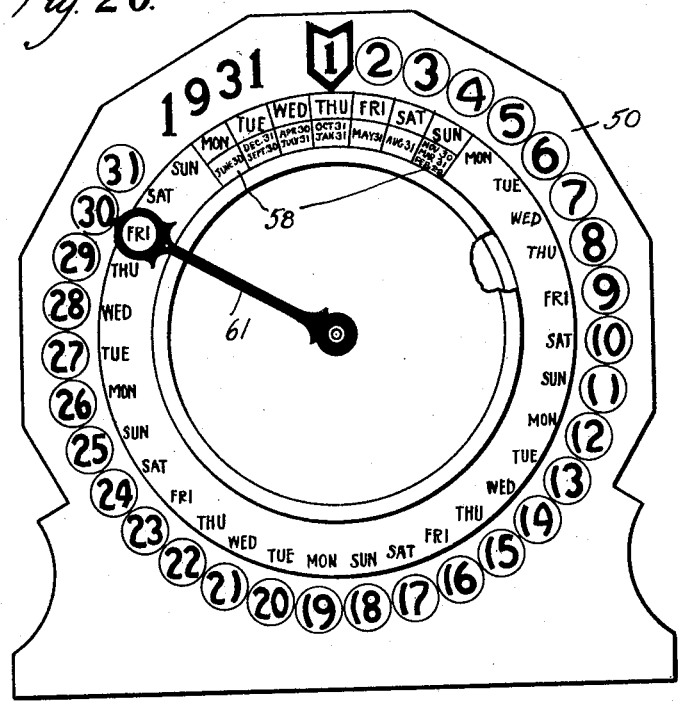
Fig. 20 shows a further modification of my calendar in which the names of the months on the year sheet are arranged in groups opposite the day of the week upon which their first days fall.
Figure 21:
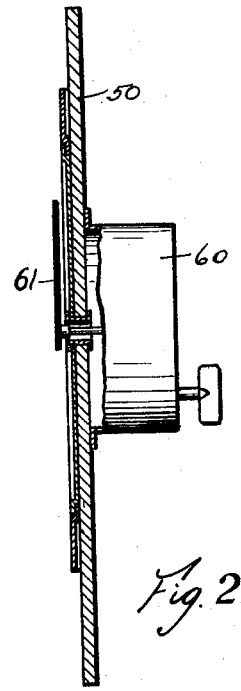
Fig. 21 shows a central transverse section of Fig. 20.
Figure 22:
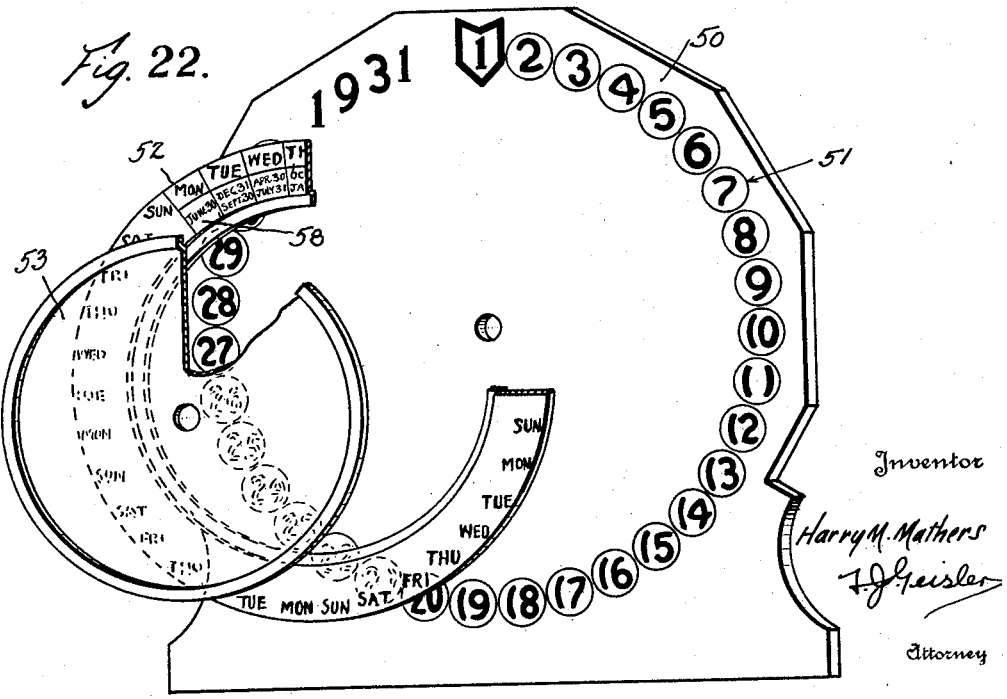
Fig. 22 shows a perspective view of this modification with the date ring and retaining disc separated therefrom but in the order of assembly.

In Figs. 20 to 22, inclusive, I have illustrated a still further modification of my calendar comprising a back section 50 having a date ring 51 printed thereon and an annular year ring 52 concentric with the date ring and rotatably mounted upon a retaining disc 53 carried by the back section 50.

The date ring 51 is similar to those before described but in the year ring the month names are all grouped oppositely the same week day upon which their first days fall. That is the first days of September and December both fall on Tuesday so that they are arranged opposite the same Tuesday on the year ring, similarly the first days of February, March and November each fall on Sunday, so they are arranged opposite the same Sunday. That is the month names are arranged opposite the days of one week, preferably the week at the top of the page, whereby the maximum rotation of the year ring 52 in order to bring the week day upon which the first day of the desired month falls opposite the Fig. 1 on the date ring, is limited to seven spaces on the date ring, as at 58. Such construction not only simplifies the operation of my calendar, but also such limited rotation of the year ring does not noticeably change the positions of the names of the week day with respect to the horizontal and thus there is no confusion as might result from reading the year ring when the printed matter is inclined at a considerable angle with the horizontal by its rotation.

I have provided a simple clock mechanism 60 adapted to operate a hand 61 and to cause the latter to move one space each day. Of course, in this modification as in the form of my calendar described with reference to Figs. 1 to 6, the hand 61 must be moved at the end of the month over the intervening spaces to the Fig. 1 on the date ring.

I claim:

1. A date indicating calendar comprising, a primary circular disc provided on the margin of its face with consecutive groups of the names of the days of the week arranged seriatim and with the names of the months arranged seriatim and so located that the name of each month registers with the day of the week on which the first day of such month falls, a secondary circular disc provided on its face with the numerals 1 to 31, inclusive, the said numerals arranged to coincide with the consecutive names of the week days on the primary disc, the spaces between the numerals 31 and 1 being left blank, one of said discs being relatively rotatable, whereby the relative rotation of one of said discs to bring the first of said numerals into registration with the week day name on which the first day of a particular month falls will adjust the calendar for such month.

2. A date indicating calendar comprising, a primary circular disc provided on the inner margin of its face with consecutive groups of the names of the days of the week arranged seriatim and on the outer margin of its face with the names of the months arranged seriatim and so located that the name of each month registers with the day of the week on which the first day of such month falls, a secondary central circular disc provided on its face with the numerals 1 to 31, inclusive, the said numerals arranged to coincide with the consecutive names of the week days on the primary disc, the spaces between the numerals 31 and 1 being left blank, one of said discs being relatively rotatable, whereby the relative rotation of one of said discs to bring the first of said numerals into registration with the week day name on which the first day of a particular month falls will adjust the calendar for such month.

3. A date indicating calendar comprising, a primary circular disc provided on the margin of its face with consecutive groups of the names of the days of the week arranged seriatim and with the names of the months arranged seriatim and so located that the name of each month registers with the day of the week on which the first day of such month falls, a secondary circular disc provided on its face with the numerals 1 to 31, inclusive, the said numerals arranged to coincide with the consecutive names of the week days on the primary disc, the spaces between the numerals 31 and 1 being left blank, one of said discs being relatively rotatable, an indicator element connecting said month name and the name of the week day, whereby the relative rotation of one of said discs to bring the first of said numerals into registration with the week day name on which the first day of a particular month falls will adjust the calendar for such month.

4. A date indicating calendar comprising, a primary circular disc provided on the margin of its face with consecutive groups of the names of the days of the week arranged seriatim and with the names of the months arranged seriatim and so located that the name of each month registers with the day of the week on which the first day of such month falls, a secondary circular disc provided on its face with the numerals 1 to 31, inclusive, the said numerals arranged to coincide with the consecutive names of the week days on the primary disc, the spaces between the numerals 31 and 1 being left blank, one of said discs being relatively rotatable, whereby the relative rotation of one of said discs to bring the first of said numerals into registration with the week day name on which the first day of a particular month falls will adjust the calendar for such month, and a hand pivoted on the axle of rotation of the rotatable disc.

5. A date indicating calendar comprising, a primary circular disc provided on the margin of its face with consecutive groups of the names of the days of the week arranged seriatim and with the names of the months arranged seriatim and so located that the name of each month registers with the day of the week on which the first day of such month falls, a secondary circular disc provided on its face with the numerals 1 to 31, inclusive, the said numerals arranged to coincide with the consecutive names of the week days on the primary disc, the spaces between the numerals 31 and 1 being left blank, one of said discs being relatively rotatable, whereby the relative rotation of one of said discs to bring the first of said numerals into registration with the week day name on which the first day of a particular month falls will adjust the calendar for such month, and a clock driven hand pivoted on the axle of rotation of the rotatable disc.

6. A date indicating calendar comprising, a primary circular disc provided on the inner margin of its face with consecutive groups of the names of the days of the week arranged seriatim and with the names of the months arranged in a group and so located that the name of each month registers with the day of the week on which the first day of such month falls, a secondary circular disc provided on its face with the numerals 1 to 31, inclusive, the said numerals arranged to coincide with the consecutive names of the week days on the primary disc, the spaces between the numerals 31 and 1 being left blank, one of said discs being relatively rotatable, whereby a limited rotation of one of said discs will bring the first of said numerals into registration with the week day name on which the first day of a particular month falls and adjust the calendar for such month.

7. A date indicating calendar comprising a primary, annular disc provided on its face with consecutive groups of the names of the days of the week arranged seriatim, a secondary annular disc provided on its face with a series of rotatable smaller discs bearing the numerals 1 to 31 inclusive, the said smaller discs arranged to coincide with the consecutive names of the days of the week on the primary disc, the smaller discs between the numerals 31 and 1 being left blank, means for restraining said numerals carried by the smaller discs to an upright position notwithstanding the rotation of the secondary disc, whereby the rotation of said secondary disc to bring the numeral 1 into registration with the week day name on which the first day of a particular month falls will adjust the calendar for such month.

8. A date indicating calendar comprising a primary, annular disc provided on its face with consecutive names of the days of the week arranged seriatim, a rotatable secondary annular disc provided on its face with the numerals 1 to 31 inclusive, the said numerals arranged to coincide with the consecutive names of the week days on the primary disc, the spaces between the numerals 31 and 1 being left blank, one of said discs being relatively rotatable, whereby the relative rotation of one of said annular discs to bring the first of said numerals into registration with the week day name on which the first day of a particular month falls will adjust the calendar for such month, a clock driven hand adapted to indicate the current day of the week and month.

9. A date indicating calendar comprising, a primary circular disc provided on the margin of its face with consecutive groups of names of the days of the week arranged seriatim and with the names of the months arranged seriatim and so located that the name of each month registers with the day of the week on which the first day of such month falls, a secondary rotatable circular disc provided on its face with a series of rotatable smaller discs bearing the numerals 1 to 31, inclusive, the said smaller discs arranged to coincide with the consecutive names of the days of the week on the primary disc, means for restraining said numerals carried by the smaller discs to an upright position, notwithstanding the rotation of the secondary disc, whereby the rotation of said secondary disc to bring the numeral 1 into registration with the weekday name on which the first day of a particular month falls will adjust the calendar for such month.

10. A date indicating calendar comprising a primary circular disc provided on the margin of its face with consecutive groups of the names of the days of the week arranged seriatim and with the names of the months arranged seriatim and so located that the name of each month registers with the day of the week on which the first day of such month falls, a secondary rotatable circular disc provided on its face with a series of rotatable smaller discs bearing the numerals 1 to 31 inclusive, the said smaller discs arranged to coincide with the consecutive names of the days of the week on the primary disc, the smaller discs between the numerals 31 and 1 being left blank, gravity controlled means for restraining said numerals carried by the smaller discs to an upright position, notwithstanding the rotation of the secondary disc, whereby the rotation of said secondary disc to bring the numeral 1 into registration with the weekday name on which the first day of a particular month falls will adjust the calendar for such month.

11. A date indicating calendar comprising a primary circular disc provided on the margin of its face with consecutive groups of names of the days of the week arranged seriatim, a secondary rotatable circular disc provided on its face with a series of rotatable smaller discs bearing the numerals 1 to 31, inclusive, the said smaller discs arranged to coincide with the consecutive names of the days of the week on the primary disc, the smaller discs between the numerals 31 and 1 being left blank, gravity controlled means for restraining said numerals carried by the smaller discs to an upright position, notwithstanding the rotation of the secondary disc, whereby the rotation of said secondary disc to bring the numeral 1 into registration with the weekday name on which the first day of a particular month falls will adjust the calendar for such month.

HARRY M. MATHERS.